United States Patent [19]

Brigante

[11] 4,226,720
[45] Oct. 7, 1980

[54] UNITARY PACKAGE FOR WATER TREATMENT FOR ATTACHMENT TO HOME HOT WATER HEATER

[76] Inventor: Miguel F. Brigante, 16550 NW. Tenth Ave., Miami, Fla. 33169

[21] Appl. No.: 9,669

[22] Filed: Feb. 5, 1979

Related U.S. Application Data

[63] Continuation-in-part of Ser. No. 474,580, May 30, 1974, abandoned, Ser. No. 672,819, Apr. 1, 1976, and Ser. No. 855,951, Nov. 30, 1977, Pat. No. 4,151,090.

[51] Int. Cl.³ .............................................. C02F 1/48
[52] U.S. Cl. .................................................. 210/222
[58] Field of Search .................... 210/42 S, 222, 223, 210/243, 354; 308/37, 135, DIG. 10; 415/72

[56] References Cited

U.S. PATENT DOCUMENTS

| | | | |
|---|---|---|---|
| 1,474,260 | 11/1923 | Hein | 415/72 X |
| 1,714,268 | 5/1929 | Jones | 308/135 X |
| 1,949,660 | 3/1934 | Roberts | 210/223 X |
| 2,067,108 | 1/1937 | Upton | 415/72 |
| 2,171,460 | 8/1939 | Thrasher | 415/72 X |
| 3,402,820 | 9/1968 | Lohmann | 210/222 |
| 3,463,319 | 8/1969 | Moragne | 210/223 |
| 3,680,705 | 8/1972 | Happ et al. | 210/222 |

*Primary Examiner*—Robert H. Spitzer
*Attorney, Agent, or Firm*—Abraham A. Saffitz

[57] ABSTRACT

A unitary package for water treatment for attachment to a home hot water heater which is adapted to be easily serviced and readily monitored by the homeowner. The water treatment device is an electrical device especially adapted for separating magnetic particles such as iron particles in feed water pipes to home hot water heaters and the like. The basic structure comprises an electromagnetic coil energized by household line voltage which completely encircles the inlet pipe. The inside of the inlet pipe is fitted with special bearings which support a solid helical impeller which rotates only when water flows through the pipe. The helical impeller is made of ferromagnetic material and is fitted to a very close tolerance to the wall of the inlet pipe thereby sweeping in a broom fashion the inner wall free from particles which tend to deposit on the wall. The electromagnetic unit is a separate part of the package and is completely contained within a housing. The helical impeller with its shaft traverses the entire length of the electromagnetic coil. The shaft of the impeller is supported on long life bearings mounted within the inlet pipe at each end of the electromagnetic coil so as to produce a high flux density and field intensity surrounding the blades of the helical impeller. The package unit and pipe can be easily fitted by the homeowner into the city water line.

4 Claims, 10 Drawing Figures

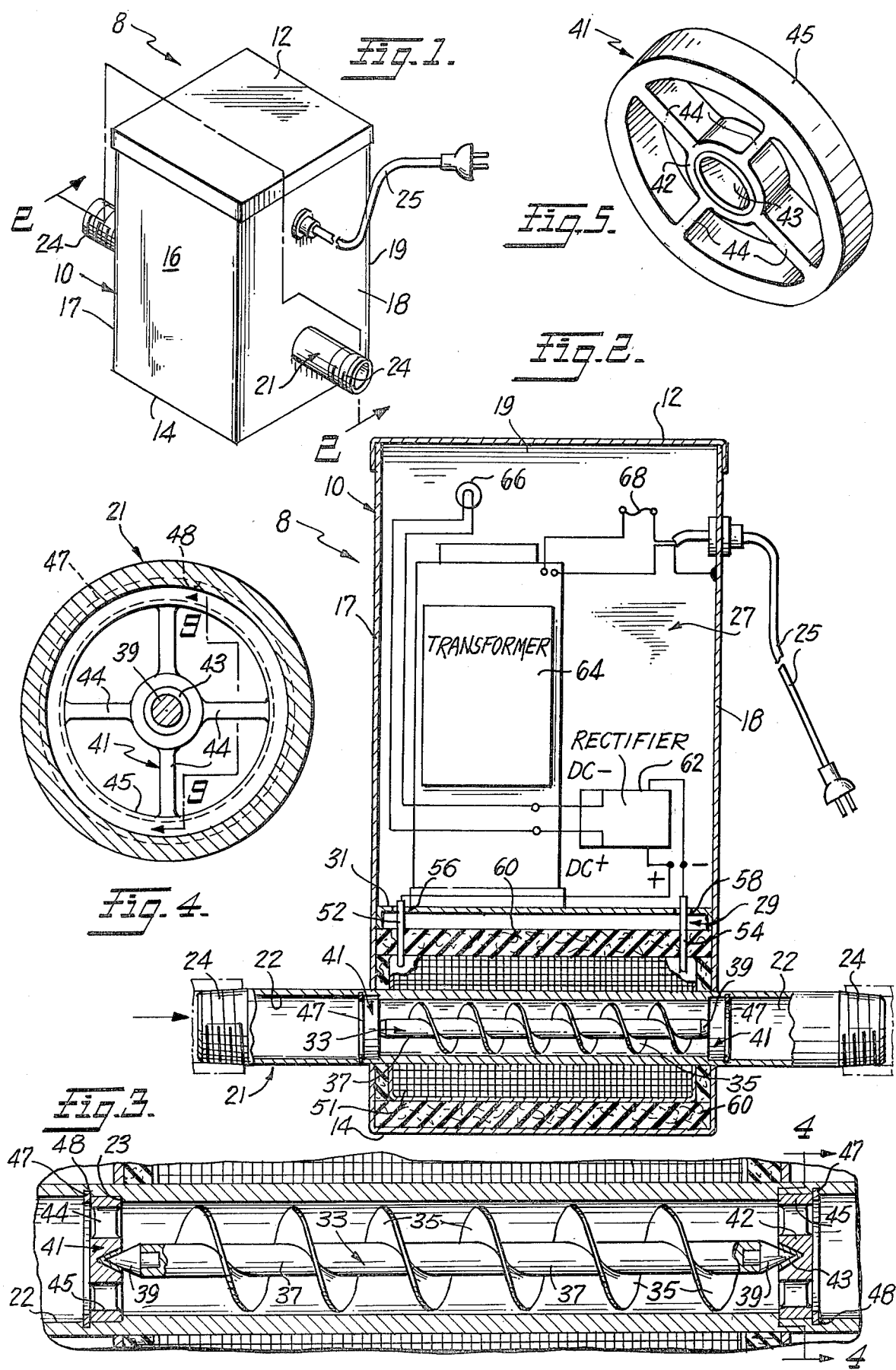

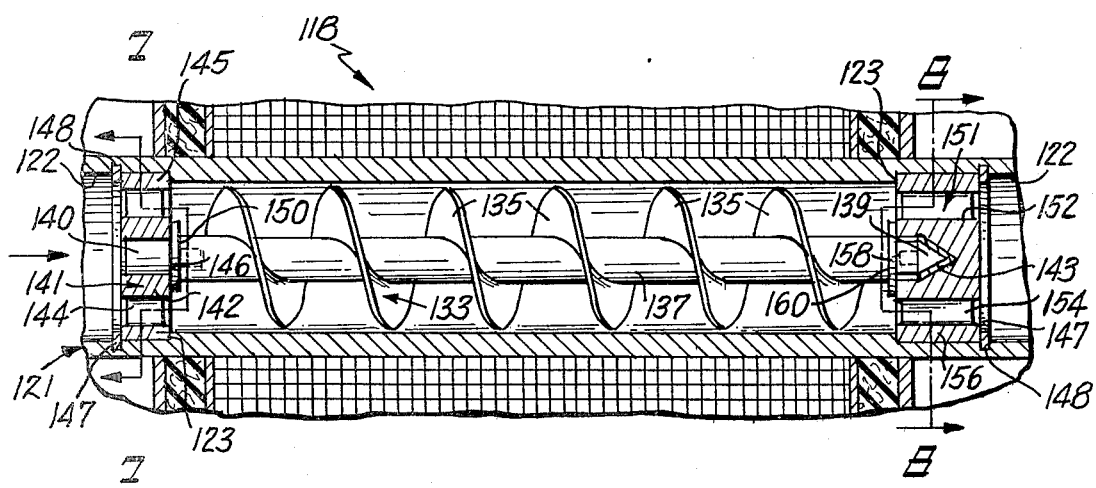
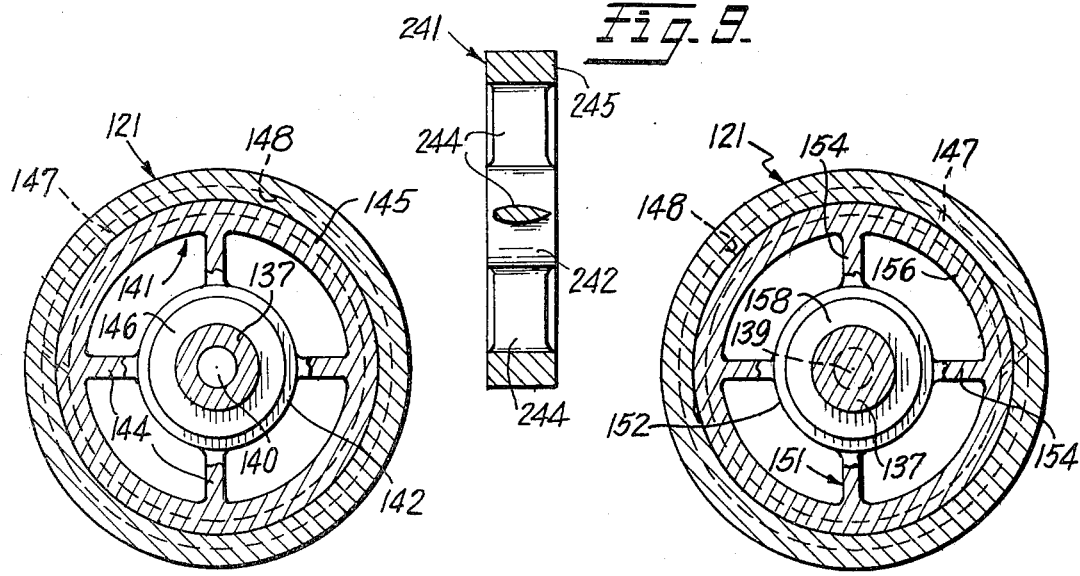
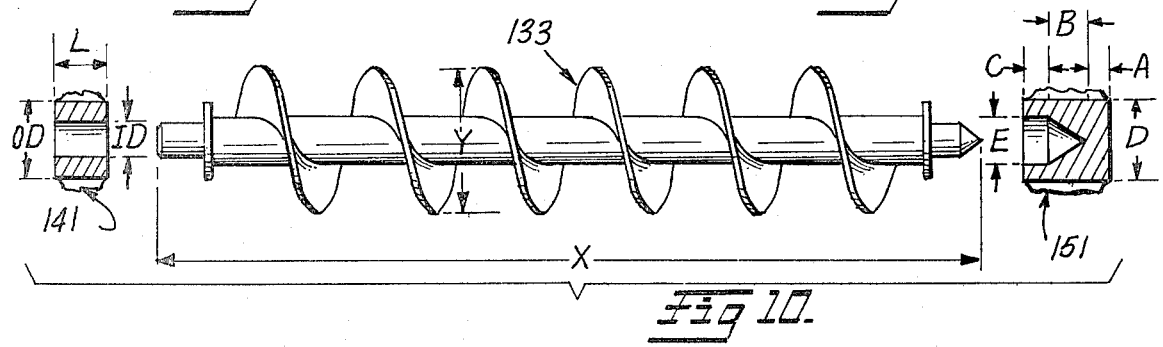

4,226,720

UNITARY PACKAGE FOR WATER TREATMENT FOR ATTACHMENT TO HOME HOT WATER HEATER

RELATIONSHIP TO PRIOR APPLICATIONS

This application is a continuation-in-part of my prior application, Ser. No. 474,580, filed May 30, 1974, now abandoned, and copending application Ser. No. 672,819, filed Apr. 1, 1976, and copending application Ser. No. 855,951, filed Nov. 30, 1977, now U.S. Pat. No. 4,151,090, entitled "Unitary Package for Water Treatment for Attachment to Home Hot Water Heater."

BACKGROUND OF THE INVENTION

1. Field of the Invention

This invention lies in the general field of liquid purification and separation apparatus wherein a magnetic treatment means, in this instance an electromagnetic coil encircling the outside of an inlet pipe containing feed water being treated, is provided for the prevention of deposits by suspended particles of high mineral content, as for example iron oxide in the feed water influenced by said magnetic treatment means. This primary magnetic treatment is combined with an additional separating means comprising an elongated ferromagnetic helical screw impeller responsive to feed water flow and varying pressure closely fitted within the inlet pipe to sweep away the magnetically attracted particles.

This invention also lies in the field of rotary kinetic fluid motors or pumps in combination with a liquid purification and separation appartus, in this instance, a special engineered and designed ferromagnetic helical impeller with six flights fitted to very close tolerance within a pipe is supported on radial plain bearings with very little power consumption per bearing, long bearing life, low cost and facility of installation and maintenance. The bearings are designed to provide low friction for the shaft impeller with very low whirl or whip and still maintain the clearance allowance for the impeller blades.

2. BRIEF DESCRIPTION OF THE PRIOR ART

The basic concept of a separately packaged electromagnetic water treatment device which separates the power source from the electrical conversion machines, e.g., electromagnetic separator used to treat the incoming water is shown in FIG. 4 of the patent to Moragne, U.S. Pat. No. 3,463,319. This patent shows, in FIG. 1, electrical coils 80 secured about a conical separator 10 which functions for the removal of salt or other elements from sea water. In FIG. 4 a battery of such separators, each with its coil, is fed from a salt water source through a pump and the power source for the coils is located at a remote location.

Another teaching of an electrical conversion subassembly used for water treatment separated from an electrical transformer circuit is shown in Roberts, U.S. Pat. No. 1,949,660. In FIG. 1 of this patent, there is shown a high frequency generator and transformer coupled to an electromagnet which together impress magnetic fields on a liquid tubular housing 30 through which an emulsion passes. These combined fields break the emulsion.

In neither Roberts nor Moragne is there a teaching of a unitary special package for the machine adapting the electrical conversion subassembly to be fitted into one compartment of the package and the magnetic assembly and special solid helical impeller supported on special bearings within a conduit for water treatment.

U.S. Pat. No. 2,067,108 to Upton discloses an auger circulating pump, comprising a cylinder 11, an auger 18 within the cylinder supported on bearings 27a and 30, respectively, wherein said auger is driven by a pulley.

U.S. Pat. No. 1,714,268 to Jones discloses a method and structure for assembling a simple shaft 12 on bearing elements 10 and 11 having recessed bearing surfaces A and B.

In neither of the patents to Jones or Upton is there a teaching of a water purification device housing an electromagnetic subassembly coacting with a solid helical impeller supported on special bearings within a conduit for the auxiliary action of sweeping the impeller rotational movement of a close tolerance helical impeller made of ferromagnetic material and supported on specially designed bearings.

This sweeping action in the present invention results in a flow between the outer screw flight and the inner pipe surface which lies in a direct straight line path parallel to, as well as along, the side of the center axis of the pipe section constituting the conduit type housing in the lower compartment of the package.

OBJECTS OF THE INVENTION

An object of the invention is to provide a unitary special package for water purification adapted to easily attach to a home appliance such as a hot water heater or boiler in which package a separate upper compartment is provided for an electrical conversion AC-DC apparatus and a separate lower compartment is provided for a magnetic treatment unit comprising a conduit-type housing for direct straight line flow of water being treated by an electromagnetic coil encircling the housing and inner close fitting ferromagnetic helical band elongated impeller of six flights specially mounted on bearings within the conduit and subjected to a high flux density to respond to low water pressure flow and sweep the inner wall of the conduit, thereby preventing the deposit of particles suspended in the feed water.

A further object of the invention is to provide an improved bearing structure for the secondary magnetic sweeping device comprising a very closely fitting inner elongated solid helical screw impeller to provide for optimum and secure placement of said impeller within the conduit pipe, this improved bearing structure having tapered recesses with Graphalloy surfaces or similar non-friction surfaces.

A further object of the invention is to provide an improved bearing structure for the secondary magnetic sweeping device comprising a very closely fitting inner elongated solid helical screw impeller to provide for optimum and secure placement of said impeller within the conduit pipe, this improved bearing structure supporting the shaft of the impeller at one end comprising a bearing having a tapered recess with Graphalloy surfaces, and a bearing structure supporting the opposite end of the impeller shaft comprising a journal or bushing sleeve wherein the inner supporting surfaces are impregnated with graphite or made of Graphalloy.

Still a further object of the invention is to provide an assembly unit adapting the precise location of the impeller within the confines of the electromagnet unit and conduit.

A further object of the invention is to provide a close fitting helical impeller within a conduit that operates under low velocity and water pressure and yet does not permit leakage of water because of high clearance.

Still another object of the invention is to provide an improved bearing structure for a helical impeller shaft with long bearing life, reduced power consumption per bearing, low cost and facility of installation and maintenance, reduced shaft deflection and reduced whirl or whip of the shaft.

Other and further objects will be apparent from the drawings and following descriptions.

SUMMARY OF THE INVENTION

A special multi-chambered unitary container comprising in a first chamber an electrical conversion apparatus, in this instance a step-down AC-DC transformer which is separately housed in the special container, this special container enhancing and facilitating home hot water heater operation by preventing the build up of harmful deposits in water conduits and accessories. Thus one chamber of the multi-chamber unitary container serves to house the electrical subassembly and a second chamber of the unitary container serves to house the electromagnetic coil, pipe unit, helical impeller and bearings at a location entirely within the confines of the first electrical subassembly. The present improvement encompasses the precise location of a six flight solid helical impeller which is completely encircled by the electromagnetic unit. The helical impeller is made of ferromagnetic material and is fitted to a very close tolerance to the wall of the inlet pipe for sweeping the deposits on the inner wall. The shaft end of the impeller is supported on specially engineered and designed bearings fitted inside the inlet pipe at opposite ends of the electromagnetic unit.

BRIEF DESCRIPTION OF THE DRAWINGS

FIG. 1 shows an elevational view in perspective view of the preferred embodiment of the invention comprising a unitary package of the electrical apparatus water treatment device illustrating the external aspects of the package;

FIG. 2 is a sectional view along line 2—2 of FIG. 1 with certain parts broken away to show details of construction in the electrical components of the lower compartment of the special package and also showing the electrical conversion apparatus and safety features in the upper part of the package;

FIG. 3 is an enlarged detail of the helical impeller supported on bearings within the inlet tube as illustrated in the lower part of FIG. 2;

FIG. 4 is a vertical cross-sectional view along line 4—4 of FIG. 3 of the bearing;

FIG. 5 shows an elevational view in perspective view of each of the spider bearings illustrated in FIGS. 2 and 3;

FIG. 6 is a fragmentary vertical cross-sectional view of a modification of the helical impeller supported on bearings within the inlet tube;

FIG. 7 is a cross-sectional view along line 7—7 of FIG. 6 of the bearing;

FIG. 8 is a cross-sectional view along line 8—8 of FIG. 6 of the bearing;

FIG. 9 is a staggered vertical sectional view taken on line 9—9 of FIG. 4 through the spider showing a modification of the spider arm having a tapered, streamlined configuration;

FIG. 10 is an exploded view, partly in section, of the impeller shaft and the spider bearing.

DESCRIPTION OF THE PREFERRED EMBODIMENTS

In all of the embodiments of the invention, the number of screw flights is illustrated at about six and, in each of these, a balanced rotation responsive to water pressure is achieved. It is possible to increase the number of screw flights to about eight but beyond this number the interflight distances are too close to provide satisfactory operation in the presence of the high colloidal solids content of ordinary drinking water, whether supplied by municipal central control or in a rural community.

Less than six flights, e.g. three to five flights, does not provide a sufficient magnetic advantage in the concentration of the magnetic field due to the substantially lesser quantity of metal projecting from the rotating shaft.

In a preferred embodiment of the invention which is shown in FIGS. 1 and 2, the unitary package 8 is in the form of a two compartment rectangular box 10 formed of a rectangular top wall 12, corresponding bottom wall 14 and rectangular side walls 16, 17, 18 and 19.

The unitary package 8 is formed of an upper compartment 27 and lower compartment 29. As shown in FIGS. 1 and 2, the lower compartment 29 houses the inlet pipe 21 in which the rotating impeller means 33 is supported. The rotating impeller means 33 constitutes the secondary magnetic treatment responding to water pressure. The primary magnetic treatment means is the DC energized electrical coil 51 wound about the entire longitudinal span of pipe 21 between side walls 17 and 18 of the unitary package.

The ends of the pipe 21 extend on each side of the package 8 from the bottom compartment thereof and, as shown in FIG. 2, are provided with threaded ends 24.

The preferred form of connection between the boiler line and the threaded ends of the pipe 21 in the unitary package 8 and between the city water line and the package 8 is by means of a collar which joins the threaded end 24 at the lower left of FIG. 2 to the city water line and the threaded end 24 at the lower right of FIG. 2 to the boiler line.

As shown in FIG. 2, the upper compartment 27 of the unitary package 8 is connected to 100 volt AC line 25, fuse 68, step down transformer 64, full wave rectifier 62 and DC leads 52 and 54, and pilot light 66. The step down transformer 64 reduces voltage to 24 volts which is fed into rectifier 62 and then to leads 52 and 54 and then to electromagnet coil 51. The electromagnet coil is insulated with relatively thick absorptive mineral wool insulation 60 specially adapting the package for high moisture environments.

The relationship between the diameter of the impeller and the inner diameter of the pipe, the impeller dimensions and the helical contour of the screw impeller provide the responsive surface which rotates as a result of water flow. The sweeping action is due to the placement of the outer surface of the helical impeller 33 close to the inner wall, e.g., with a clearance tolerance between 1/16" and 1/128". For optimum results, the solid helical impeller 33 is designed with six flights of ferromagnetic material and extends the full length of the electromagnet coil so as to produce a high flux density and field intensity surrounding the blades of the impeller.

The ends of the impeller shaft are conically shaped at 39 and are supported by spider bearings 41 mounted in counterbores 22 formed in pipe 21. The spider bearings 41 are locked in position at outer flanges 45 by split snap rings 47 fitted in corresponding grooves 48 formed in the pipe 21. Each of the spider bearings 41 comprises radially spaced arms 44 and a hub portion 42 formed with a conically shaped recess 43 having a graphite impregnated bearing surface, Graphalloy surface, or chrome alloy surface for supporting the conically shaped ends 39 of shaft 37.

The six flights 35 of the helical impeller provide an inner surface which resists flow in the direction of the arrow, e.g., city water into the lower compartment. The close spacing and rotation, even at low water pressure, provide a sweeping action. The action goes along the entire conduit length. The induced magnetic field effectively suspends the particles which respond to the magnetic fields and to the rotational sweeping action.

The induced magnetic field reaches a value of more than 3,000 Oersteds within the close spacing clearance area of less than about 1/16". In comparison to my prior patent applications, of which this application is a continuation-in-part, increasing the flights from two and one-half to six effectively doubles the longitudinal extent of this highly intense magnetic field confined within the cylindrical envelope of close tolerance. The water which escapes through this envelope traverses a longer path of intense magnetic field than in the aforesaid parent applications.

It has been determined that by cutting back from six flights to four flights does not give the trouble free operation and the impeller must be removed for cleaning about every six months to free it of gummy colloidal matter on the interflight surfaces. Beyond eight flights the benefit of rapid rotation is lost.

The spider bearings consume very little power because of the treated bearing surfaces. In addition, they have a long bearing life, are low cost, easy to install and practically maintenance free. As pointed out infra, because of the dimensional characteristics of the impeller shaft and spider bearings, the shaft impeller whip or whirl is reduced to infinitesimal value. The additional advantages of treating the bearing surfaces are to reduce abrasiveness of contaminants and provide resistance to corrosion. Thus the bearing structure has been specifically engineered and designed to consider all of these operating factors when used in severely contaminated water supply at widely varying water pressures.

In another modification illustrated fragmentarily in FIGS. 6, 7 and 8, the water conditioner unitary package 118 similarly discloses a conduit inlet 121 traversing the side walls of the package. The pipe 121 is similarly counterbored adjacent each end at 122 and is provided with shoulders 123 for abutment with a spider bearing 141 and 151 at opposite ends. Each of the spider bearings 141 and 151 are locked in position on pipe 121 by means of split snap rings 147 fitting into grooves 148 respectively. The spider bearing 141 comprises redially spaced arms 144, a flange portion 145 and a hub portion 142 formed with a graphite impregnated bearing surface 142, Graphalloy surface, or chrome alloy surface for supporting impeller shaft end 140 of annular shape.

The spider bearing 151 comprises a plurality of radially spaced arms 154, an outer flange portion 145 and a hub portion 142 formed with a conically shaped portion 143 having a graphite impregnated bearing surface, or chrome alloy surface, for supporting conically shaped end 139 of shaft 137. Each end of shaft 137 is provided with a press fit washer at 146 and 158 to provide stability for the impeller, while the shaft end portion 140 is constrained radially in hub portion 142. Thus, the shaft 137 impeller is permitted to rotate freely in bearings 141 and 151. Again, the sweeping action is due to the placement of the outer surface of a six flight impeller 133 with a clearance tolerance of between 1/16" and 1/128" between the outer diameter of the impeller blade 135 and the inner diameter of the pipe 121.

A particularly desirable embodiment of the invention is shown in FIG. 9 in which spider 241 is provided with tapered, streamlined arms 244 directed toward the hub 242. These tapered, streamlined arms 244 particularly adapt the efficient flow under low municipal water pressure because of their configuration. Spider 241 fits easily into spider ring 245. Each of the spider bearings illustrated in FIGS. 2, 3 and 4 may be further modified to provide the plurality of radially spaced arms 244 shown in FIG. 9 which face the flow line so as to reduce the pressure drag and thus provide a streamlined flow with a minimum of fluid resistance.

In a preferred modification as shown in FIG. 10 it has been empirically determined that the following dimensional characteristics of the impeller shaft and spider bearings provide optimum performance with various size pipes.

As shown in FIG. 10, the graphite bearing is provided with stainless steel tips and a stainless steel washer, identified as C in the Table below, at each end of the shaft. The following dimensions are shown for the different size pipes. The bushings at the graphite stainless steel tip is Graphalloy bushing.

TABLE I

| Model No. | A | B | C | D | E |
|---|---|---|---|---|---|
| 1 | ⅛ | ⅛ | ⅛ | .385 / .383 | .245 |
| 2 | ⅛ | 3/16 | 3/16 | .566 / .564 | .307 |
| 3 | ⅛ | 7/16 | 3/16 | .691 / .689 | .432 |

TABLE II

| Model No. | ID | OD | L |
|---|---|---|---|
| 4 | 3/16 | .441 / .439 | .255 / .245 |
| 5 | ¼ | .504 / .502 | .255 / .245 |
| 6 | ⅜ | .629 / .627 | .380 / .370 |

MODEL NUMBER GLOSSARY
Model 3000L ¾" pipe can be used. One bearing #1 and one #4 (sleeve bushing) or two graphite bearings #1
Model 5000H 1" pipe can be used. One bearing #1 and one #4 (sleeve bushing) or two graphite bearings #1
Model 5002H 1¼" pipe can be used. One bearing #2 and one #5 or two #2
Model 5003H 1½" pipe can be used. One bearing #3 and one #6 or two #3
Model 5004H 2" pipe can be used. One bearing #3 and one #6 or two #3
Impeller: Tube impeller tolerance:
1/32 Optimum
1/16 Maximum
1/128 Minimum

TABLE III

Flight Dimensions as shown in FIG. 10:

| Pipe Size | Dimension X | Dimension Y | Flight Number |
|---|---|---|---|
| ¾" | 8" | .718 | 6 |
| 1" | 8½" | .958 | 6 |
| 1¼" | 10¼" | 1.268 | 6 |
| 1½" | 12¾" | 1.938 | 6 |

It is considered that wearing of a point bearing could make the impeller turn at a rate to dislodge it, especially where extremely high volumes of water pass through. Also, back flushing with high volumes of water could dislodge a point bearing. To avoid these two conditions the combination of a point bearing (tip) at one end and a round bearing at the other end provides the ideal solution to dislodgement danger. This is shown in FIG. 10.

I claim:

1. A unitary special package for attachment to a home hot water heater between a municipal water line and the water inlet of the heater comprising:

a package casing having a top, a bottom and sides therebetween enclosing electrical conversion AC to DC apparatus and an electromagnetic assembly about a straight pipe section in the package for water treatment inside the casing;

an upper compartment immediately below the top of said casing in which is mounted a step down transformer converting 110–220 volts to 24 volts AC and a DC rectifier converting said 24 volts input into DC output for energizing an electromagnet coil in a lower compartment of the package;

a lower compartment containing a straight pipe section between the casing sides which projects from the sides and thus forms a straight line for direct communication between the municipal water line and the inlet line to the hot water heater;

an electromagnet coil extending along substantially the entire length of said pipe section between the casing sides;

said electromagnet coil being fed by 24 volts DC to thereby induce a DC magnetic field within the interior of said pipe section through which water flows;

a spider bearing fitting into said straight pipe section within said package in alignment with each of said sides, said spider bearing having a plurality of radially spaced arms to permit free flow of water therethrough, one of said spider bearings having a hub portion formed with a conically shaped recess having a graphite impregnated bearing surface;

an elongated solid helical impeller of ferromagnetic material having a first end shaft portion of conical shape fitting into the conically shaped recess of the spider bearing supported for rotation responsive to incoming municipal water flow; and said helical impeller longitudinally traversing the entire length of said electromagnet coil and having a clearance tolerance between 1/16" and 1/128" between helical flights of the impeller and the inner diameter of the pipe section so that the helical impeller is adapted to rotate both at low flow velocity and at extremely high volume of water whereby said helical impeller will not whip under said conditions.

2. A unitary package as claimed in claim 1 wherein said helical impeller comprises six flights.

3. A unitary package as claimed in claim 1 wherein said helical impeller comprises a second shaft end portion of annular shape fitting into an annular recess portion of a hub in a second one of said spider bearings mounted in alignment with another side of said casing.

4. A unitary package as claimed in claim 1 wherein the flow between the helical flights of the impeller and the inner pipe surface lies in a direct straight line parallel to, as well as along, the side of the center axis of the pipe section and wherein each of the spider bearings have a plurality of radially spaced arms formed with tapered surfaces facing the flow line so as to reduce the pressure drag and provide a streamlined flow with a minimum of fluid resistance.

* * * * *